(12) United States Patent
Weber

(10) Patent No.: US 7,283,332 B2
(45) Date of Patent: Oct. 16, 2007

(54) SUSPENSION WITH IMPROVED GIMBAL

(75) Inventor: Steven Lee Weber, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 455 days.

(21) Appl. No.: 10/640,334

(22) Filed: Aug. 13, 2003

(65) Prior Publication Data

US 2005/0036239 A1 Feb. 17, 2005

(51) Int. Cl.
*G11B 21/16* (2006.01)

(52) U.S. Cl. ............... 360/245.5; 360/244.8; 360/244.9; 360/245; 360/245.7

(58) Field of Classification Search ............. 360/244.2, 360/244.8, 244.9, 245, 245.1, 245.3, 245.4, 360/245.5, 245.7
See application file for complete search history.

(56) References Cited

U.S. PATENT DOCUMENTS

| | | | | |
|---|---|---|---|---|
| 5,299,080 A * | 3/1994 | Mizuno et al. | ........... | 369/13.17 |
| 5,428,490 A | 6/1995 | Hagen | ........................ | 360/104 |
| 5,434,731 A | 7/1995 | Hagen | ........................ | 360/104 |
| 5,504,640 A | 4/1996 | Hagen | ........................ | 360/104 |
| 5,608,590 A | 3/1997 | Ziegler et al. | .............. | 360/104 |
| 5,612,841 A | 3/1997 | Johnson | ....................... | 360/104 |
| 5,638,234 A | 6/1997 | Hagen | ........................ | 360/104 |
| 5,711,063 A | 1/1998 | Budde et al. | ............. | 29/603.06 |
| 5,896,246 A | 4/1999 | Budde et al. | ............... | 360/104 |
| 5,901,430 A | 5/1999 | Ziegler et al. | ........... | 29/603.06 |
| 5,923,500 A | 7/1999 | Hagen | ........................ | 360/104 |
| 6,115,221 A * | 9/2000 | Utsunomiya | ............. | 360/245.1 |
| 6,147,840 A | 11/2000 | Khan | ....................... | 360/245.9 |
| 6,215,626 B1 * | 4/2001 | Kajitani | ................... | 360/245.1 |
| 6,304,420 B1 * | 10/2001 | Murphy et al. | ........... | 360/245.7 |
| 6,373,662 B1 | 4/2002 | Blaeser et al. | ........... | 360/245.5 |
| 6,392,844 B1 * | 5/2002 | Summers | ................. | 360/245.5 |
| 6,397,455 B1 | 6/2002 | Hagen | ...................... | 29/603.03 |
| 6,424,498 B1 * | 7/2002 | Patterson et al. | ........ | 360/245.7 |
| 7,006,332 B2 * | 2/2006 | Nakamura et al. | ....... | 360/294.3 |
| 2002/0012202 A1 | 1/2002 | Hagen | ...................... | 360/244.2 |
| 2002/0034039 A1 | 3/2002 | Hagen | ...................... | 360/97.01 |
| 2002/0034051 A1 | 3/2002 | Hagen | ...................... | 360/245.3 |
| 2003/0086207 A1 * | 5/2003 | Watadani et al. | ........ | 360/244.9 |

FOREIGN PATENT DOCUMENTS

| | | | | |
|---|---|---|---|---|
| JP | 58006552 A | * | 1/1983 | |
| JP | 59193581 A | * | 11/1984 | |
| JP | 60167172 A | * | 8/1985 | |
| JP | 01128277 A | * | 5/1989 | |
| JP | 07093927 A | * | 4/1995 | |
| JP | 07105649 A | * | 4/1995 | |
| JP | 08329636 A | * | 12/1996 | |

(Continued)

*Primary Examiner*—William J Klimowicz
(74) *Attorney, Agent, or Firm*—Leanne Taveggia Farrell; Westman, Champlin & Kelly, P.A.

(57) ABSTRACT

A suspension includes a load beam section and a gimbal section, which is formed with the load beam section as a single, continuous piece of material, having a top surface and a bottom surface. The gimbal section has a first end formed with to the load beam section and is bent along the first end such that the bottom surface of the material along the gimbal section faces the bottom surface of the material along the load beam section.

20 Claims, 6 Drawing Sheets

FOREIGN PATENT DOCUMENTS

| | | | |
|---|---|---|---|
| JP | 11007740 A | * | 1/1999 |
| JP | 11066782 A | * | 3/1999 |
| JP | 11213590 A | * | 8/1999 |
| JP | 2000298966 A | * | 10/2000 |
| JP | 2002245741 A | * | 8/2002 |

* cited by examiner

SUSPENSION WITH IMPROVED GIMBAL

FIELD OF THE INVENTION

The present invention relates generally to transducers, such as data recording heads in data storage systems.

BACKGROUND OF THE INVENTION

Suspensions are used in a variety of products for accurately positioning and supporting a transducer. For example, suspensions are used to support read/write heads in disc drives. A typical disc drive includes a housing that encloses a variety of disc drive components. The components include one or more rotating discs having data surfaces that are coated with a medium for storage of digital information in a plurality of circular, concentric data tracks.

The discs are mounted on a spindle motor that causes the discs to spin and the data surfaces of the discs to pass under respective aerodynamic bearing disc head sliders. The sliders carry transducers, which write information to and read information from the data surfaces of the discs. The slider and transducer are often together referred to as the "head." An actuator mechanism moves the heads from track to track across the surfaces of the discs under control of electronic circuitry. The actuator mechanism includes a track accessing arm and a suspension for each slider. The suspension includes a load beam and a gimbal. The load beam provides a preload force, which forces the slider toward the disc surface. The gimbal is positioned between the slider and the load beam, or is integrated in the load beam, to provide a resilient connection that allows the slider to pitch and roll while following the topography of the disc.

The suspension generates the preload force through a preload bend in the load beam, which becomes elastically deformed when the suspension is loaded into the disc drive. The preload bend is typically formed near a base plate of the suspension, which is adjacent the track accessing arm. The load beam has a relatively rigid portion, which transfers the preload force from the elastically deformed preload bend to the slider. The rigid portion is typically made by forming stiffening rails or flanges along the longitudinal edges of the suspension.

In general, the suspension is manufactured through a punch and die process and then assembled. This process punches and drills the load beam material and the gimbal material. The gimbal is then attached to the load beam by welding or adhesion. This manufacturing process and assembly is time consuming as well as costly because of the plurality of steps and components required. Integrated suspensions in which the gimbal and load beam are formed from a single piece of material have also been devised. These designs, however, do not provide proper gimbaling action or become deformed under the preload force. In addition, devising an integrated suspension is costly because both the gimbal and load arm must be formed out-of-plane from each other. A need exists for an improved suspension, which can be manufactured in a simple, yet cost effective manner.

Embodiments of the present invention provide solutions to these and other problems, and offer other advantages over the prior art.

SUMMARY OF THE INVENTION

One embodiment of the present invention is directed to a suspension, which includes a load beam section and a gimbal section. The gimbal section is formed with the load beam section as a single, continuous piece of material, which has a top surface and a bottom surface. The gimbal section has a first end formed with the load beam section and is bent along the first end such that the bottom surface of the material along the gimbal section faces the bottom surface of the material along the load beam section.

Another embodiment of the present invention is directed to a method of forming a suspension. The method includes forming a gimbal section with a load beam section as a single, continuous piece of material, which has a top surface and a bottom surface. The method also includes bending the gimbal section relative to the load beam section such that the bottom surface of the material along the gimbal section faces the bottom surface of the material along the load beam section.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
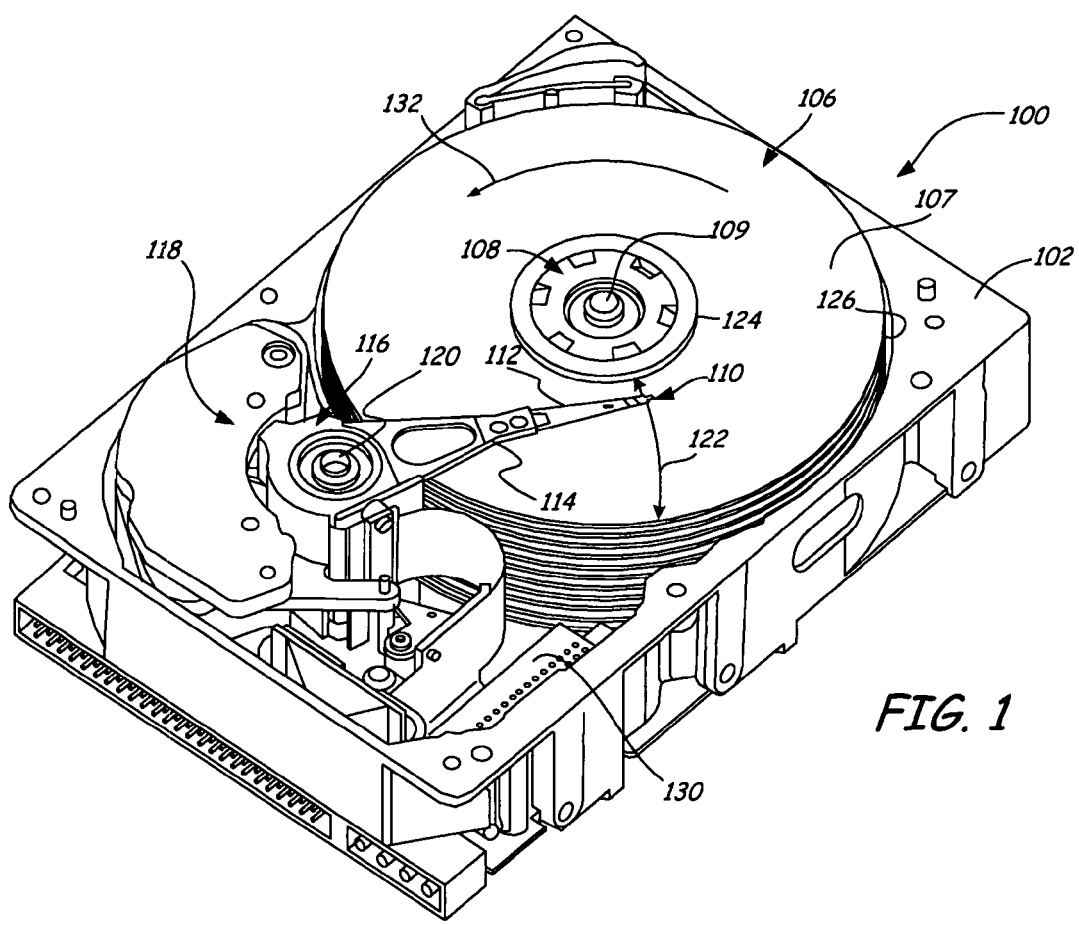
FIG. 1 is a perspective view of a data storage system.

FIG. 1 is a perspective view of a disc drive 100 in which embodiments of the present invention are useful. Disc drive 100 includes a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110, which carries a transducer for communication with the disc surface.

Each slider 110 is supported by a suspension 112 which is in turn attached to a track accessing arm 114 of an actuator mechanism 116. Actuator mechanism 116 is rotated about a shaft 120 by a voice coil motor 118, which is controlled by servo control circuitry within internal circuit 130. As voice coil motor 118 rotates actuator mechanism 116, sliders 110 move in an arcuate path 122 between a disc inner diameter 124 and a disc outer diameter 126.

During operation, as discs 107 rotate in a rotational direction 132, the discs 107 drag air (or other fluid) under the respective sliders 110 and along their bearing surfaces. As air passes beneath the bearing surfaces, air compression along the air flow path causes the air pressure between the disc 107 and the bearing surfaces to increase, which creates an aerodynamic lifting force that counteracts the preload force provided by suspension 112. The preload force forces sliders 110 towards the surface of the discs. The aerodynamic lifting force that counteracts the preload force causes the sliders 110 to lift and fly above, but in close proximity to the disc surfaces. Alternatively, sliders 110 can operate in direct contact with the disc surfaces. While FIG. 1 illustrates one manner of actuating the data head proximate a data storage medium, the present invention, however, is applicable to systems that use other actuation techniques, such as a linear actuator.

Figure 2:
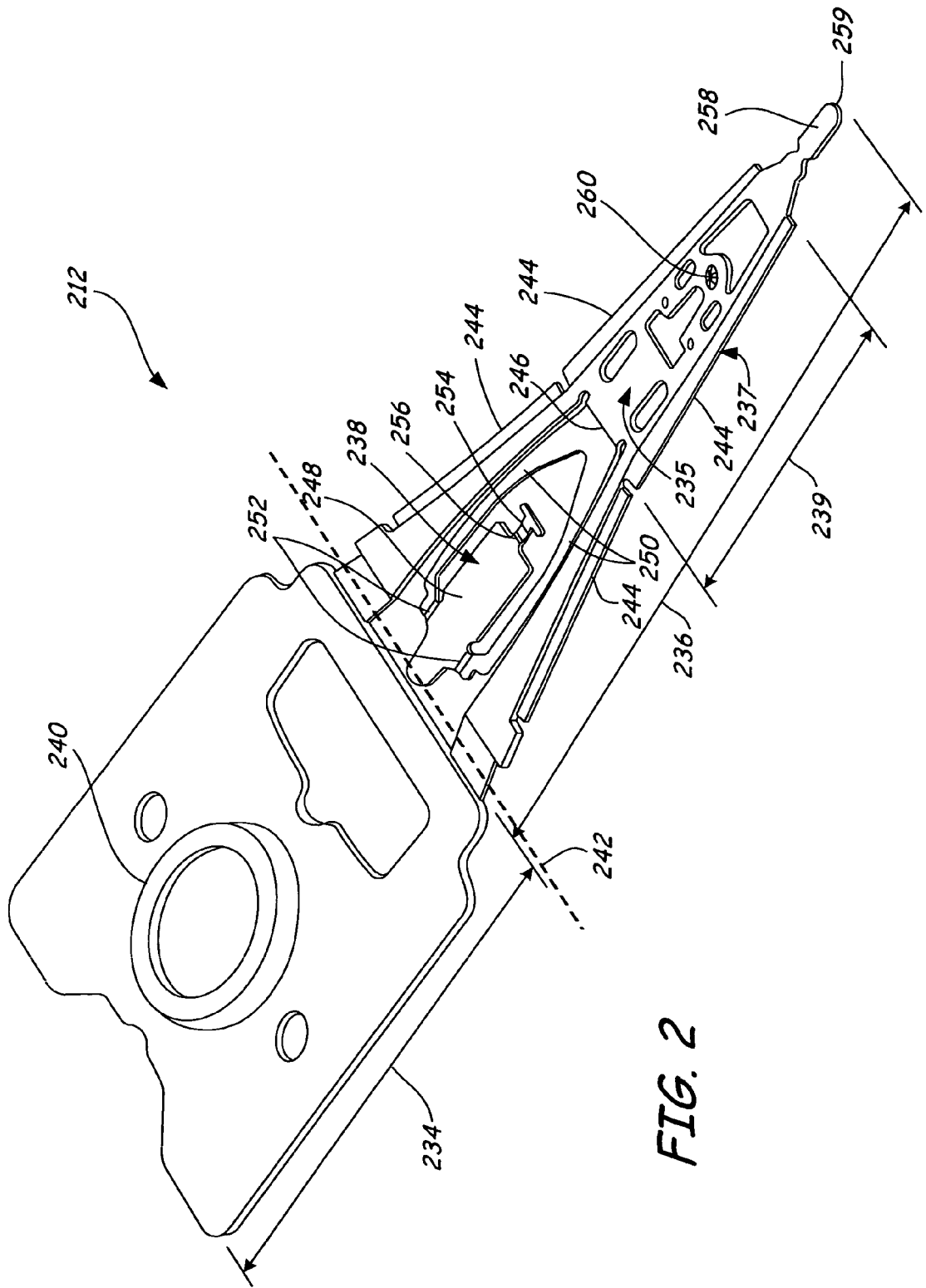
FIG. 2 is a perspective view of a suspension, during manufacture, in accordance with an embodiment of the present invention.

FIG. 2 is a perspective view of suspension 212, during manufacture, in accordance with an embodiment of the present invention. In general, suspension 212 is formed with a progressive die manufacturing process. A progressive die manufacturing process is a process wherein suspension 212 undergoes multiple operations of punching and bending at high production rates. In this illustration, suspension 212 has undergone a shearing process to cut the suspension material by subjecting suspension 212 to shear stresses between a punch and die. Those skilled in the art will recognize that other manufacturing processes, such as etching, can be used to form suspension 212 as illustrated in FIG. 2.

Suspension 212 is a single, continuous piece of stainless steel or other metallic and/or non-metallic material that has a substantially planar main body with top surface 235 and bottom surface 237. Suspension 212 includes a baseplate section 234, load beam section 236, gimbal section 238 and dimple section 239. Those skilled in the art will recognize that although suspension 212 is a single, continuous piece of material, portions of suspension 212 can be formed with multiple pieces of material in other embodiments. In addition, it should be noted that gimbal section 238 of FIG. 2 is not yet a finished manufactured piece.

Baseplate section 234 is located at a proximal end of load beam section 236 and includes an actuator mounting aperture 240 for mounting suspension 212 to a respective track accessing arm, such as track accessing arm 114 as illustrated in FIG. 1. For example, baseplate section 234 can be mounted to a track accessing arm by ball-staking. Those skilled in the art will recognize that other methods of attachment could be used.

Load beam section 236 includes a preload bend 242, stiffening rails 244 and load/unload feature 258. Preload bend 242 supplies a preload force to a slider, such as slider 110 illustrated in FIG. 1, which forces the slider towards the surface of a disc, such as disc 107 illustrated in FIG. 1. In this particular illustration of suspension 212, preload bend 242 is located in an area that has been thinned by a partial chemical etch. Those skilled in the art should recognize that in other embodiments a chemical etch is not needed. Load beam section 236 includes stiffening rails 244 that provide additional stiffness to load beam section 236. This additional stiffness transfers the preload force generated by preload bend 242 to the slider. Like preload bend 242, stiffening rails 244 are thinned by a partial chemical etch such that the bending operation that forms the rails and the preload bend does not creep into the planar main body of load beam section 236. It should be noted that the manufacturing process in FIG. 2 does not yet show stiffening rails 244 bent out-of-plane with respect to the planar main body of the load beam section 236.

Load beam section 236 also includes load/unload feature 258, which is located at distal end 259 of suspension 212. Load/unload feature 258 provides a location for suspension 212 to ramp up when the track accessing arm is at rest.

Gimbal section 238 has a first end 246 formed with load beam section 236, between baseplate section 234 and distal end 259. Gimbal section 238 includes central tongue 248, gimbal arms 250 and deflection limiter 254. In one embodiment, central tongue 248 is at least partially chemically etched. Gimbal arms 250 are bent out-of-plane with respect to central tongue 248 by offset bends 252. Gimbal arms 250 provide out-of-plane pitch and roll flexibility and in-plane stiffness. Deflection limiter 254 has a first end 256 formed with central tongue 248. Deflection limiter 254 limits deflection of and damage to gimbal section 238 during ramp load/unload. Central tongue 248 provides a surface on which to attach a slider following manufacture of suspension 212.

Dimple section 239 is formed with load beam section 236, between a proximal end of load beam section 236 and distal end 259. Dimple section 239 includes dimple 260 and a plurality of apertures. Dimple 260 provides a load point at which the preload force can be transferred to the slider when the slider is attached to gimbal section 238. The plurality of apertures provide alignment capabilities to load beam section 236. In particular, aperture 257 provides a locking position for deflection limiter 254.

Figure 3:
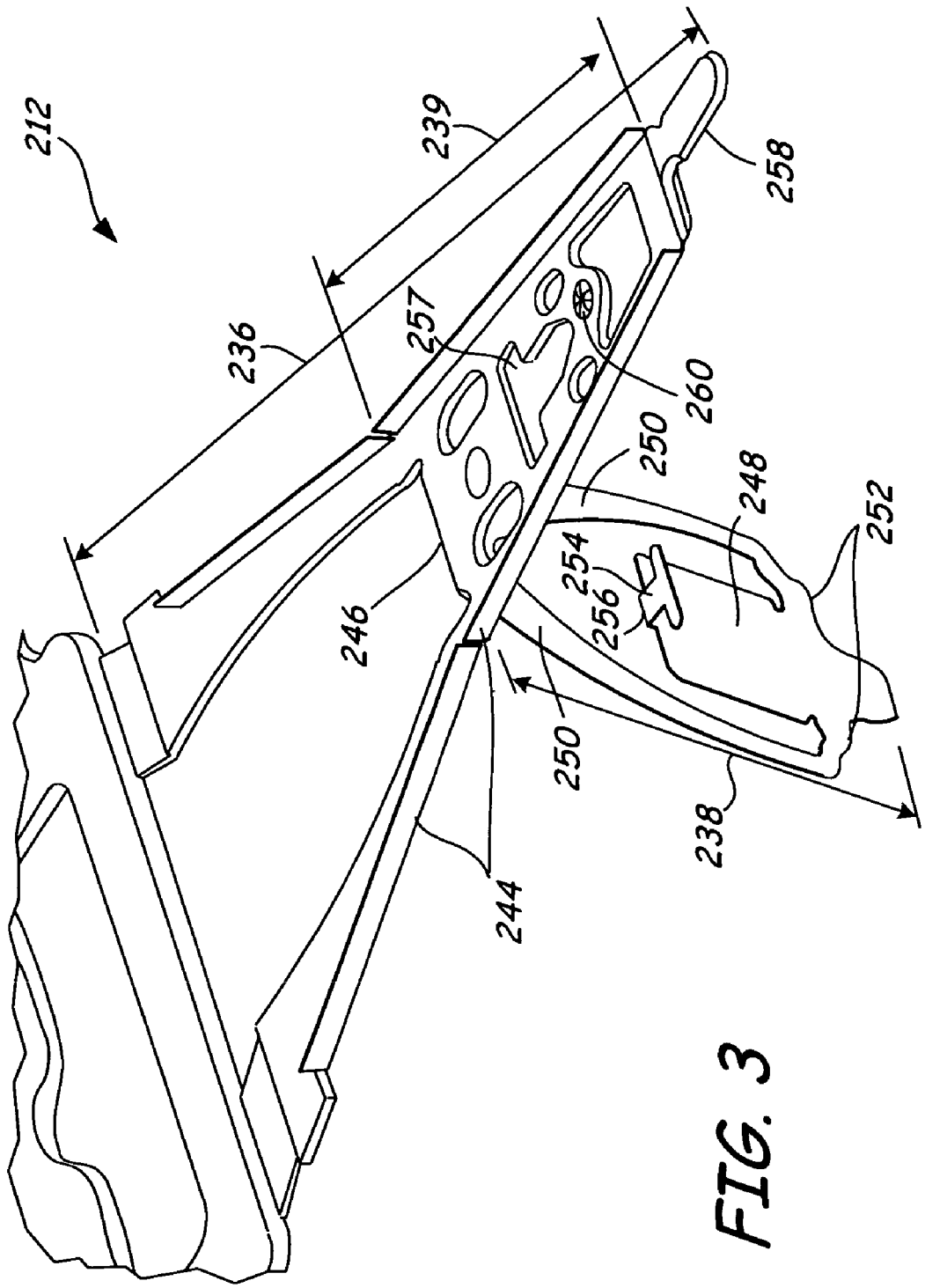
FIG. 3 is an enlarged view of a load beam section and a gimbal section of the suspension of FIG. 2 in accordance with an embodiment of the present invention.

FIG. 3 is a perspective view of suspension 212 during a bending process of manufacture in accordance with an embodiment of the present invention. Stiffening rails 244 are bent out-of-plane with respect to the main body portion of load beam section 236 at an angle substantially perpendicular to the main body portion of load beam section 236 in order to offset gimbal arms 250 from gimbal tongue 248. In addition, FIG. 3 shows a partially-formed bend along first end 246, which folds gimbal section 238 under the main body portion of load beam section 236. Also, first end 256 of deflection limiter 254 is bent such that the deflection limiter 254 is in a plane substantially normal to gimbal tongue 248 such that it will fit through aperture 257 in dimple section 239 as gimbal section 238 is bent along first end 246.

Figure 4:
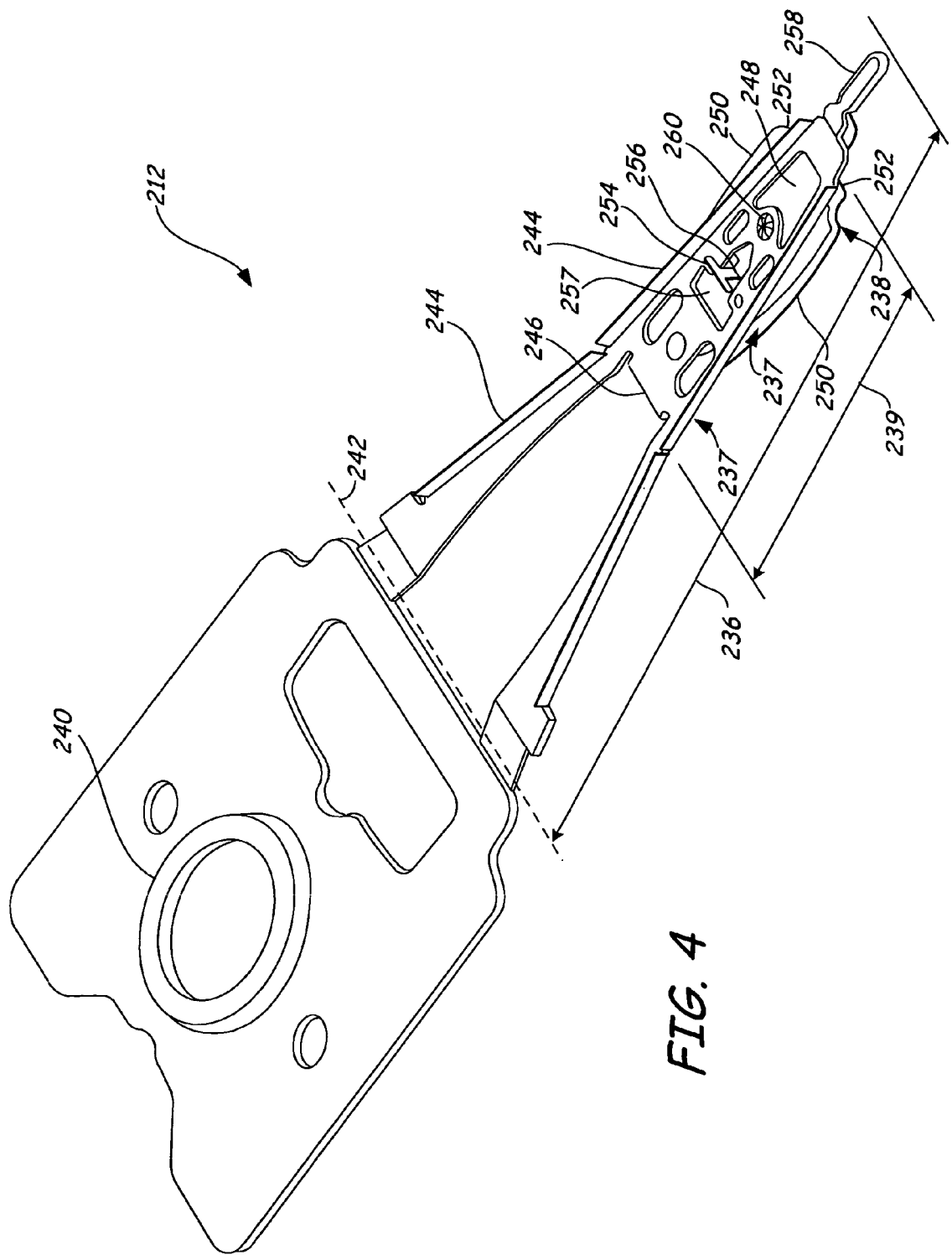
FIG. 4 is a perspective view of the suspension of FIG. 2, after manufacture, in accordance with an embodiment of the present invention.

FIG. 4 is a perspective view of suspension 212, after manufacture, in accordance with an embodiment of the present invention. Gimbal section 238 has been fully bent along first end 246 to form a hem seam, for example. This hem seam is strong enough to replicate welding of gimbal section 238 to load beam section 236. In this state, gimbal section 238 is generally parallel to load beam section 236 with bottom surface 237 of the suspension material along gimbal section 238 facing bottom surface 237 of the material along load beam section 236. Also, deflection limiter 254 is fully-formed, and locked within a narrow slot in aperture 257.

Figure 5:
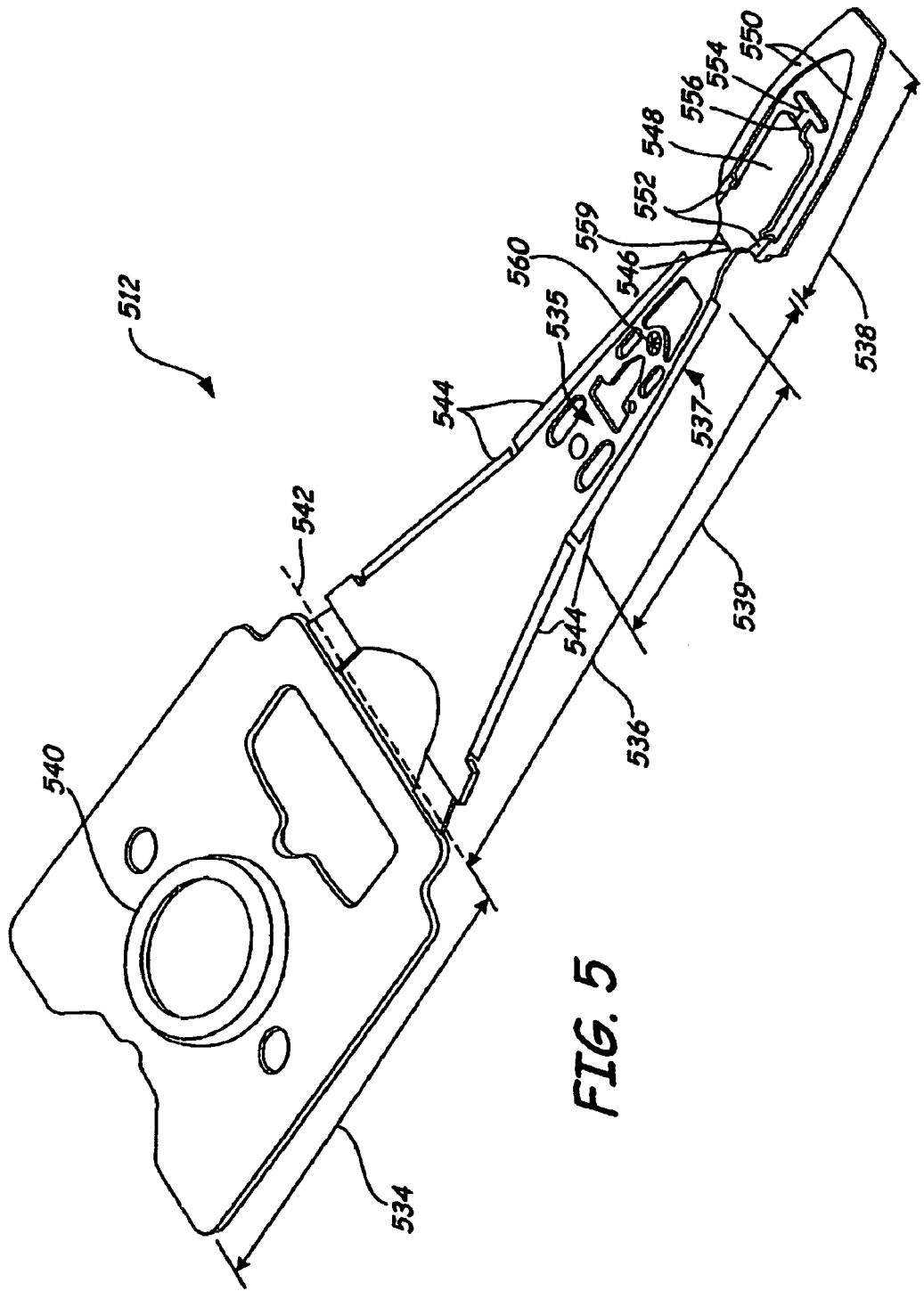
FIG. 5 is a perspective view of a suspension, during manufacture, in accordance with an alternative embodiment of the present invention.

FIG. 5 is a perspective view of suspension 512, during manufacture, in accordance with an another embodiment of the present invention. Like suspension 212 of FIG. 2, suspension 512 is formed with the progressive die manufacturing process as previously discussed. However, those skilled in the art will recognize that other manufacturing processes can be used to form suspension 512 as illustrated in FIG. 5.

Suspension 512 is a single, continuous piece of stainless steel or other metallic and/or non-metallic material that has a substantially planar main body with top surface 535 and bottom surface 537. Suspension 212 includes a baseplate section 534, load beam section 536, gimbal section 538 and dimple section 539. Those skilled in the art will recognize that although suspension 512 is a single, continuous piece of material, portions of suspension 512 can be formed with multiple pieces of material in other embodiments. In addition, like FIG. 2, gimbal section 538 of FIG. 5 is not yet a finished manufactured piece.

Baseplate section 534 is located at a proximal end of load beam section 536 and includes an actuator mounting aperture 540 for mounting suspension 512 to a respective track accessing arm, such as track accessing arm 114 as illustrated in FIG. 1. Load beam section 536 includes a preload bend 542 and stiffening rails 544. It should be noted that stiffening rails 544 are not yet bent out-of-plane with respect to the planar main body of the load beam section 536. Load beam section 536 also includes a distal end 559.

In this embodiment, gimbal section 538 has a first end 546 formed with load beam section 536 at distal end 559, rather than in the main body portion as shown in FIG. 2. Gimbal section 538 includes central tongue 548, gimbal arms 550 and deflection limiter 554. Central tongue 548 is partially chemically etched while gimbal arms 550 are bent out-of-plane with respect to central tongue 548 by offsets bends 552. Deflection limiter 554 has a first end 556 formed with central tongue 548 of gimbal section 538.

Dimple section 539 is formed with load beam section 536, between a proximal end of load beam section 536 and distal end 559. Dimple section 539 includes dimple 560 and a plurality of apertures. Dimple 560 provides a load point which the preload force can be transferred to the slider when the slider is attached to gimbal section 538. The plurality of apertures provide alignment capabilities to load beam section 536. In particular, aperture 557 provides a locking position for deflection limiter 554.

Figure 6:
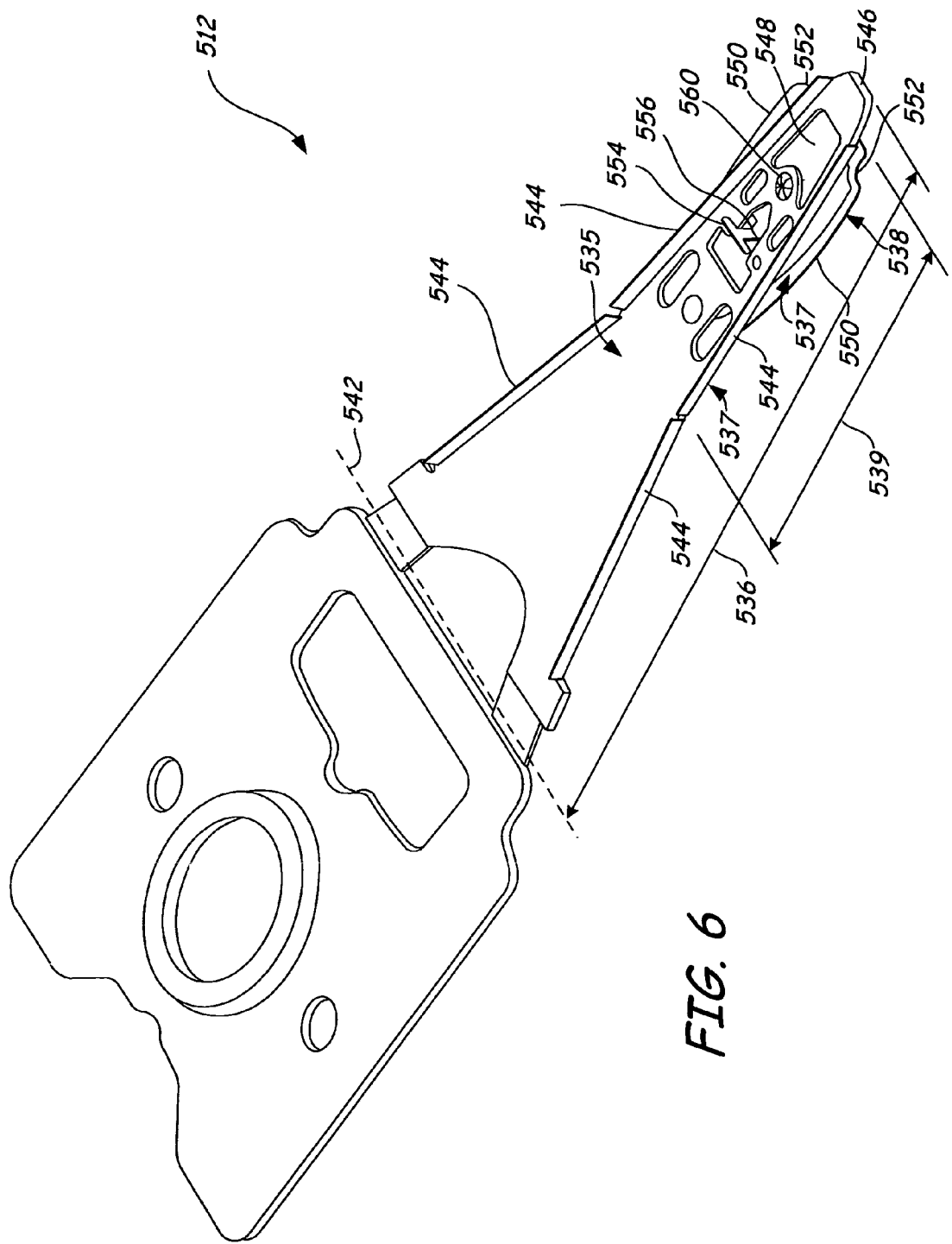
FIG. 6 is a perspective view of the suspension of FIG. 5, after manufacture, in accordance with an alternative embodiment of the present invention.

FIG. 6 is a perspective view of suspension 512, after manufacture, in accordance with an embodiment of the present invention. In this illustration, suspension 512 has undergone the bending process, such that stiffening rails 544 are bent out-of-plane with respect to the main body portion of load beam section 536 and gimbal section 538 has been fully bent along first end 546. Bottom surface 537 along gimbal section 538 faces bottom surface 537 along load beam section 536. In addition, deflection limiter 554 is bent along first end 556 such that the deflection limiter 554 is in a plane substantially normal to a plane of gimbal section 538.

The embodiments shown in FIGS. 1-6 are provided as examples only. The gimbal section can be attached to the load beam section on any surface or edge of the material in other embodiments of the present invention.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a particular type of suspension, it will be appreciated by those skilled in the art that the teachings of the present invention can be applied to other suspension types, without departing from the scope and spirit of the present invention.

What is claimed is:

1. A suspension comprising:
   a load beam having a proximal end, a distal end, a main body portion and stiffening rails which are formed along opposing side edges of the main body portion; and
   a gimbal formed with the load beam as a single, continuous piece of material, which has a top surface and a bottom surface, and formed of material in the main body portion of the load beam, wherein the gimbal has a first end formed along a bend in the load beam between the proximal end and the distal end, such that the bottom surface of the material along the gimbal faces the bottom surface of the material along the load beam and wherein the top surface of the material of the gimbal is coupled to and supports a slider.

2. The suspension of claim 1, wherein the first end of the gimbal forms a hem seam with the load beam.

3. The suspension of claim 1 and further comprising a baseplate located at the proximal end of the load beam.

4. The suspension of claim 1, wherein the first end of the gimbal is attached to the load beam between the proximal end and the distal end of the load beam.

5. The suspension of claim 1, wherein the gimbal is generally parallel to the load beam.

6. The suspension of claim 1, wherein the gimbal further comprises a deflection limiter.

7. The suspension of claim 6, wherein the deflection limiter includes a first end attached to the gimbal and is bent along the first end such that the deflection limiter is in a plane substantially normal to a plane of the gimbal and extends through an aperture in the load beam.

8. The suspension of claim 1, wherein the material of the gimbal, of which the bottom surface of the material along the gimbal faces the bottom surface of the material along the load beam, comprises a central tongue of which supports the slider on the top surface of the material of the gimbal.

9. The suspension of claim 8, wherein the material of the gimbal, of which the bottom surface of the material along the gimbal faces the bottom surface of the material along the load beam, comprises a pair of gimbal arms positioned on either side of the central tongue, wherein the gimbal arms are bent out of plane from the central tongue.

10. A suspension comprising:
    a load beam having a proximal end and a distal end;
    a load point; and
    a gimbal formed with the load beam as a single, continuous piece of material between the load point and the proximal end, wherein the material has a top surface and a bottom surface and wherein the bottom surface of the material along the gimbal faces the bottom surface of the material along the load beam and wherein the top surface of the material of the gimbal is coupled to and supports a slider.

11. The suspension of claim 10 and further comprising a baseplate located at the proximal end of the load beam.

12. The suspension of claim 11, wherein the gimbal is formed between the proximal end and the distal end of the load beam.

13. The suspension of claim 10, wherein the gimbal further comprises a first end formed along a bend in the load beam, the first end positioned between the proximal end and the load point.

14. A suspension comprising:
    a load beam having a proximal end and a distal end; and
    a gimbal formed with the load beam as a single, continuous piece of material, which has a top surface and a bottom surface, and having a first end formed along a bend in the load beam and a second end, wherein the bottom surface of the material along the gimbal faces the bottom surface of the material along the load beam and the first end is positioned closer to the proximal end than the second end and wherein the top surface of the material of the gimbal is coupled to and supports a slider.

15. The suspension of claim 14, wherein the gimbal is formed with the load beam between a preload bend and a load point.

16. A suspension comprising:

a single, continuous piece of material that includes a load beam and a gimbal, which has a top surface and a bottom surface, wherein the gimbal is formed of a portion of the material between stiffening rails formed on opposing side edges of the material, and wherein the gimbal is pivotally located beneath a portion of the load beam such that the bottom surface of the material along the gimbal faces the bottom surface of the material along the load beam and wherein the top surface of the material of the gimbal is coupled to and supports a slider.

17. The suspension of claim 16, wherein the gimbal comprises a first end formed with the load beam and a second end.

18. The suspension of claim 17, wherein the first end of the gimbal is bent.

19. The suspension of claim 16, wherein the gimbal further comprises a deflection limiter.

20. The suspension of claim 19, wherein the deflection limiter includes a first end attached to the gimbal and is bent along the first end such that the deflection limiter is in a plane substantially normal to a plane of the gimbal and extends through an aperture in the load beam.

* * * * *